United States Patent Office

2,829,031
Patented Apr. 1, 1958

2,829,031

METHOD OF PRODUCING PHOSPHORUS OXYCHLORIDE

David H. Reeve, Chicago, Ill., assignor, by mesne assignments, to the United States of America as represented by the United States Atomic Energy Commission No Drawing. Application May 27, 1955
Serial No. 511,753

10 Claims. (Cl. 23—203)

This invention relates to a process for the manufacture of phosphorus oxychloride from low grade phosphate ores. More particularly, it relates to the production of fertilizers from ores containing iron and aluminum compounds. Still more particularly, it relates to the manufacture of phosphate fertilizer from so-called leached zone material of the overburden from the phosphate matrix found in the Florida pebble phosphate field.

Leached zone material is found as a distinct layer between the top cover of humus, sand and clay and the phosphate matrix in the Florida pebble phosphate fields. This material consists largely of a silty to clay-like sand containing components of aluminum, iron and phosphorus and minor values, together with other clays and slimes.

This leached zone material while not a true clay exhibits a porous and generally soft, pliable structure. Mineralogically it consists of quartz, wavellite and perhaps pseudo-wavellite as the major phases. Chemically, it is considered to be a mixture of hydrated aluminum and calcium aluminum phosphate with fine quartz, iron oxide, compounded fluorine and some clay. Also there may be some unleached and partially leached tricalcium phosphate. The following analyses of leached zone material was obtained by averaging analyses obtained from about 200 drill core samples procured over an area of about 36 square miles. The leached zone material averages as follows:

|  | Percent |
|---|---|
| $P_2O_5$ | 8.7 |
| $Al_2O_3$ | 8.7 |
| CaO | 6.4 |
| Acid insolubles | 68.7 |

Since the vast percentage of the acid insoluble material is quartz and since it is a coarser particle size than the other materials contained in the material being mined, it has been found advantageous, but not necessary to the invention, to split the ore after suitable comminution, if desired, into one fraction of small particles and another fraction of coarser particles, the split being made at from about 150 mesh up to about 220 mesh after the material has been slurried with water. The fraction containing the particles smaller than this is the valuable fraction, while the fraction containing the particles larger than this is the fraction which is for the most part quartz and is discarded.

In the processing of unsized or sized leached zone material for recovery of the phosphate values, the material with or without a preliminary calcining operation has been digested with various mineral acids such as sulfuric acid or nitric acid or with acid salts such as ammonium bisulfate. While solubilizing of leached zone constituents can be accomplished by reacting material to form the counterpart of superphosphate and leaching the mixture with water, it is generally preferred to carry out a reaction whereby a slurry is formed having the water soluble reaction products in the liquid phase.

In the prior processes, the aluminum constituents of the liquid phase or aqueous extract have been precipitated by adding to the solution ammonium sulfate. The alum or ammonium aluminum sulfate precipitated by reaction with ammonium sulfate removes about 70% of the aluminum present in the solution and about 1% of the phosphate. The resultant solution contains about all of the iron, about 99% of the phosphate and about 30% of the aluminum initially present in the aqueous solution. This resultant solution when processed to remove iron and aluminum has always given a product tying up about 70% of the phosphate present in the treated solution, leaving only about 30% of the $P_2O_5$ values for recovery in a useful form, for example, as ammonium phosphate.

It is a primary object of this invention to provide a method which overcomes the shortcomings and disadvantages of processes heretofore in use.

It is another object of this invention to recover substantially all the iron and aluminum from impure acidic phosphorus-bearing solutions.

It is a further object of this invention to separately recover the constituents of sulfuric acid, together with the basic constituents of phosphoric acid normally lost during precipitation operations as iron and aluminum phosphate.

These and other objects of the invention will be apparent to those skilled in the art from the following description.

Briefly, the invention comprises precipitating iron and aluminum from acidic phosphorus-bearing solution containing same as phosphate salts, digesting the salts with sulfuric acid, reducing the water content of the digest solution to between about 6% and about 12% by weight, separating the material crystallized from the concentrate which contains substantially all of the iron and aluminum as sulfate salts from the mother liquor comprising predominantly sulfuric and phosphoric acids, spraying the hot mother liquor on carbonaceous material maintained at temperatures sufficient to decompose sulfuric acid, recovering the oxides of sulfur produced by decomposition of sulfuric acid, reacting the phosphoric acid impregnated carbon with gaseous chlorine at temperatures in excess of about 250° C. and treating the volatile constituents to recover at least phosphorus oxychloride.

More in detail as applied to a preferred embodiment of the invention, the small particle size fraction of leached zone material obtained by splitting the solids at a size of approximately 200 mesh with or without a preliminary calcining treatment is solubilized by reaction with an acid such as sulfuric acid, sulfur dioxide or equivalent materials. In a typical reaction a 200 mesh size fraction in aqueous slurry form having a solids content in the range between about 30% and about 60% is reacted with the sulfuric acid at temperatures in the range between about 60° C. and about 90° C.

Preferably, the digestion is carried out for a period of time ranging between 0.2 and about 6 hours and still more specifically, for a period of about 30 minutes to about 60 minutes, although the length of time may be varied considerably depending upon other variations in reaction conditions. The interdependence of variables makes for vast differences in the specific conditions employed as to each variation. In general, it may be stated the higher the percent acidulation used, the lower the time required. Thus, for example, if about 100% acidulation is used, i. e., about 100 pounds of 96% sulfuric acid per 100 pounds of leached zone material, only about 15 minutes is required to accomplish the digestion, while at about 45% acidulation, about 6 hours' digestion is necessary to give good recovery of the desired constituents. Depending upon the analysis of the particular leached zone material processed, between about 30% and about 105% acidulation is desired. This corresponds to the addition of between about 50 pounds and about 150 pounds of sulfuric acid per hundred pounds of leached zone material processed. Preferably, about 70% acidulation is used. The percent acidulation referred to in this description is calculated on the basis of the reaction of sulfuric acid with all of the iron, aluminum and calcium or other significant cationic constituents present in the leached zone material. In other words, 100% acidulation would be the addition of that amount of sulfuric acid required to completely react with these components.

After digestion, the aqueous solution of reaction products is separated from the insolubles such as quartz. The solids-free solution is then treated in one of two ways. The solids-free solution may be treated directly with ammonia to precipitate all of the iron and aluminum as iron phosphate and aluminum phosphate. The solution may also be treated with ammonium sulfate, ammonium acid sulfate or a mixture thereof, to precipitate ammonium aluminum sulfate or so-called alum. This precipitation will remove a major portion of the aluminum from solution. After separating the precipitated ammonium alum solids, the solution may be treated with an ammonium reactant such as gaseous ammonia, ammonium hydroxide, ammonium carbonate and the like.

Upon adjustment of the solution to a pH in the range between about 3.5 and about 7.0, a precipitated product comprising predominantly iron phosphate and aluminum phosphate is formed. The crystalline material is separated from solution comprising predominantly ammonium phosphate and ammonium sulfate. This precipitated material is separated from the solution by, for example, filtration and is used for further processing either in a wet or dry form. Precipitated material is digested with concentrated sulfuric acid. Wet material carries with it anywhere from 20 to as much as 50% by weight of water.

The amount of sulfuric acid utilized for digestion of iron and aluminum phosphate precipitate will vary in the excess over what was required for the stoichiometric equivalent amount of acid for complete solubilizing of the precipitate depending upon the particular products which it is desired to separately recover. If the amount of sulfuric acid is limited to a maximum of 20% excess and the digest solution is heated to a temperature in the range between about 120° C. and about 250° C. until the concentrate attains an acid strength of about 70%, i. e., the weight of free sulfuric acid plus free phosphoric acid constitutes 65 to 75% of the weight of the solution, iron sulfate will be precipitated. Following this the solution may be further concentrated until the water content of the digest solution is reduced to between about 6% and about 12% which concentration step will result in the precipitation of the balance of the iron as sulfate and the aluminum sulfate. Preferably, however, the concentration is carried out in one step which reduced the water content to between about 7 and about 10%, thus setting up conditions for co-precipitation of substantially all of the iron and aluminum.

After concentration, the solution preferably is cooled to a temperature in the range between about 25° C. and about 100° C. because of the difficulty in filtering or otherwise separating solid material from hot sulfuric acid solution. The temperature of filtration may be as low as room temperature, but in the interest of speed of processing, the solutions generally are cooled to temperatures in the range between about 30° C. and about 90° C. Upon, for example, filtration of the concentrated mother liquor the solution contains very minute quantities of metals and consists predominantly of sulfuric acid and phosphoric acid.

Crude alum recovered following the ammonium sulfate reaction step, if such is used, is preferably treated in accordance with the invention of my co-pending application, Serial No. 511,752, entitled "Method of Preparing Metallurgical Grade Alumina," filed of even date herewith, which process in general deals with dehydration of crude alum at relatively low temperatures until the moles of water of crystallization are reduced to 10 or less, following which the preliminary heat treated material is mixed with coke and calcined under conditions to maintain a reducing atmosphere.

Concentrated mother liquor is sprayed upon hot carbonaceous material. Useful carbonaceous materials are vegetable coke, petroleum coke, bagasse, corn fiber or similar long carbon chain organic materials. The hot carbonaceous material is maintained for the sulfuric acid decomposition reaction at a temperature in the range between about 200° C. and about 360° C., preferably at a temperature between about 250° C. and about 300° C. This reaction in the nature of a low temperature calcination under controlled atmospheric conditions volatilizes oxides of sulfur. The $SO_4$ of the gaseous product may be recovered according to commercial practice in the manufacture of sulfuric acid.

The phosphoric acid impregnated carbon treatment is in the nature of a calcination while maintaining an atmosphere predominantly of chlorine and oxygen and reacting at temperatures in the range between about 300° C. and about 600° C.

The reaction for production of phosphorus oxychloride may be carried out in retorts, closed circuit rotary kilns or equivalent apparatus. The invention will be further understood by reference to the following example which is given by way of illustration and without any intention that the invention be limited thereto.

*Example*

Leached zone material as mined was classified to recover a minus 200 mesh fraction. This leached zone feed assayed:

| | Percent by weight |
|---|---|
| $P_2O_5$ | 14.7 |
| $Al_2O_3$ | 25.3 |
| $Fe_2O_3$ | 3.1 |
| CaO | 9.2 |
| Acid insolubles | 38.6 | as an approximately 34% solids slurry in water is mixed with acidulating medium at approximately 1.6 pounds of dry solids per pound of acidulating medium. This medium was made up of 1 pound of 96% sulfuric acid. The acidified slurry mixture was autoclaved at 200 pounds per square inch pressure at a temperature of about 390° F. for 1 hour. The resulting mass was cooled and leached countercurrently with water to recover solubilized constituents and the insoluble cake discarded.

Approximately 1.6 pounds of water per pound of dry leached zone feed was used in the countercurrent extraction of the solubilized values from the digestion. An average filtration rate throughout the countercurrent leaching operation of approximately 7 pounds of dry solids per square foot per hour was obtained. The resultant extract at approximately 1.3 specific gravity assayed approximately 4.7% $P_2O_5$, 6.6% $Al_2O_3$, .3% $Fe_2O_3$, and approximately 15.9% sulfate. Overall recoveries in the digesting and leaching circuits were approximately 89% $P_2O_5$, 81% $Al_2O_3$ and 81% $Fe_2O_3$. To this extract when at a temperature of 60° C. is added approximately 0.14 pound ammonium acid sulfate and 0.08 pound ammonium sulfate per pound of extract and the mixture cooled to approximately 20° C. to crystallize the material substantially as ammonium aluminum sulfate, also known as crude ammonium alum. This crystallized alum on a dry basis analyzes approximately 10.5% $Al_2O_3$, 38.4% sulfate, 4% ammonia, 44.8% chemical water, 0.3% $P_2O_5$, about 48.2 pounds of wet crystals, 5% moisture, are recovered per 6.57 pounds of $Al_2O_3$ in the liquor from the leached mineral digest.

The aqueous phase was then processed as follows: to 100 pounds of liquor is added approximately 15 pounds of 28% ammonium hydroxide to adjust the pH range of the aqueous phase to approximately 4.5. The solids formed were removed from solution, washed with water and the recovered material weighing approximately 35 pounds on a dry basis, assayed approximately 13.3% $Al_2O_3$, 8.0% $Fe_2O_3$, and 29.6% $P_2O_5$ on a dry basis. The resulting liquor may be processed by fractional crystallization to recover monoammonium phosphate and ammonium sulfate or any other suitable method for recovery of the $P_2O_5$ values left in the liquor.

The solids recovered from the ammonium phosphate liquor were mixed with approximately 32 pounds of 96% sulfuric acid. The water content of the digest solution was approximately 10% by weight. The solution was heated to a temperature of approximately 182° C. for 2 hours and the resultant solution cooled to a temperature of approximately 75° C. The solids were filtered from the concentrated acid solution. Analyses of the solid and liquid products were as follows:

|  | Solids, percent | Liquor, percent |
|---|---|---|
| $P_2O_5$ | 9.3 | 17 |
| $SO_4$ | 68.4 | 75.5 |
| $Al_2O_3$ | 15.2 | 0.4 |
| $Fe_2O_3$ | 4.2 | 0.2 |
| $H_2O$ | 2.3 | 6.0 |

The solids were dried in an electric oven at a temperature of approximately 200° C. and calcined at a temperature of approximately 1000° C. The calcined product analyzed:

Percent by weight
$P_2O_5$ ---------------------------------- 31.5
$SO_4$ ----------------------------------- 3.0
$Fe_2O_3$ -------------------------------- 14.1
$Al_2O_3$ -------------------------------- 51.0

Losses of phosphates in the iron sulfate product can be reduced by increasing the quantity of sulfuric acid utilized for digestion of iron and aluminum phosphate cake. If the amount of sulfuric acid added at this stage is sufficient, the $P_2O_5$ content of the calcined product can be lowered to about 10%.

Mother liquor was sprayed upon a bed of bagasse in proportions of about 3.7 pounds of mother liquor per 10 pounds of bagasse.

The solid product of this heat treatment analyzes:

Percent
C ------------------------------------- 85.5
$P_2O_5$ ------------------------------ 13.2
$SO_4$ -------------------------------- 1.0
$Al_2O_3$ ----------------------------- 0.15
$Fe_2O_3$ ----------------------------- 0.15

The solids were introduced into a retort, maintained at a temperature of approximately 550° C., the solids were agitated, air exhausted and then a controlled atmosphere of chlorine and oxygen maintained by introducing air and chlorine in controlled amounts. The charge in the retort was completely burned away in approximately 2 hours and the gaseous products were passed thru a cooler and the aqueous condensate recovered. The condensed product was distilled and the gases evolved fractionally condensed to recover a phosphorus oxychloride.

Having thus described my invention, what I claim is:

1. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solutions as the phosphate salts, separating the solid salts from solution, digesting the salts with sulfuric acid, concentrating the digest solution to substantially completely precipitate the iron and aluminum as the sulfate salts, separating the sulfate salts from concentrated phosphate-sulfate mother liquor, depositing the phosphate-sulfate mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

2. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solution as the phosphate salts, separating the salts from solution, digesting the salts with sulfuric acid, concentrating the digest solution to a free water content of less than 12% to substantially completely precipitate iron and aluminum sulfate salts separating the sulfate salts from concentrated phosphate-sulfate mother liquor, depositing the mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the materials volatilized during the reaction with chlorine.

3. A method of preparing phosphorus oxychloride from acidic phosphorus-bearing solution containing dissolved iron and aluminum impurities obtained by digestion of low grade phosphate ores with sulfuric acid, which comprises adjusting the pH to between about 3.5 and about 7.0 to precipitate iron and aluminum from impure acidic phosphorus-bearing solution as the phosphate salts, separating the salts from solution, digesting the salts with sulfuric acid, concentrating the digest solution to a free water content in the range of 7 to 10% to substantially completely precipitate iron and aluminum sulfate salts separating the sulfate salts from concentrated phosphate-sulfate mother liquor, depositing the mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the materials volatilized during the reaction with chlorine.

4. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solution as the phosphate salts, separating the salts from solution, digesting the salts with concentrated sulfuric acid in a maximum excess of 20% over the stoichiometric equivalent amount required for reaction, concentrating the digest solution to substantially completely precipitate the iron and aluminum as the sulfate salts, separating the sulfate salts from concentrated phosphate-sulfate mother liquor, depositing the mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

5. A method of preparing phosphorus oxychloride from acidic phosphorus-bearing solution containing dissolved iron and aluminum impurities obtained by digestion of low grade phosphate ores with sulfuric acid. which comprises adjusting the pH to between about 3.5 and about 7.0 to precipitate iron and aluminum from impure acidic phosphorus-bearing solution as the phosphate salts, separating the salts from solution, digesting the salts with concentrated sulfuric acid, concentrating the digest solution at a temperature in the range between about 120° C. and about 250° C., substantially completely precipitating iron and aluminum as the sulfate salts, separating the sulfate salts from concentrated phosphate-sulfate mother liquor, depositing the mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

6. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solution as phosphate salts, separating the salt from solution, digesting the salts with sulfuric acid, concentrating the digest solution to a free water content of less than about 12%, cooling the concentrated solution to a temperature in the range between about 250° C. and about 50° C. to substantially completely precipitate iron and aluminum as the sulfate salts, separating the sulfate salts from concentrated phosphate-sulfate mother liquor, depositing the mother liquor on hot carbonaceous material maintained at a temperature in the range between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

7. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solution as the phosphate salts, separating the salts from solution, digesting the salts with sulfuric acid, concentrating the digest solution to substantially completely precipitate the iron and aluminum as the sulfate salts, separating the sulfate salts from concentrated phosphate-sulfate mother liquor, spraying the mother liquor on hot carbonaceous material maintained at a temperature between about 200° C. and about 360° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

8. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solution as the phosphate salts, separating the salts from solution, digesting the salts with sulfuric acid, concentrating the digest solution to substantially completely precipitate the iron and aluminum as the sulfate salts, separating the sulfate salts from concentrated phosphate-sulfate mother liquor, spraying the mother liquor on hot carbonaceous material maintained at a temperature between about 250° C. and about 300° C. whereby sulfate contained therein is converted to oxides of sulfur, exhausting oxides of sulfur and other volatile constituents produced by the reaction, reacting the mother liquor impregnated carbonaceous material with gaseous chlorine at temperatures in excess of about 300° C. and recovering the phosphorus oxychloride from the material volatilized during the reaction with chlorine.

9. A method of preparing phosphorus oxychloride from acidic phosphorus-bearing solution containing dissolved iron and aluminum impurities obtained by digestion of low grade phosphate ores with sulfuric acid which comprises adjusting the pH to between about 3.5 and about 7.0 to precipitate iron and aluminum from impure acidic phosphorus-bearing solutions as the phosphate salts, separating the solid salts from solution, digesting the salts with sulfuric acid, concentrating the digest solution to substantially completely precipitate the iron and aluminum as the sulfate salts, separating the sulfate salts from concentrated phosphate-sulfate mother liquor, depositing the mother liquor on hot carbonaceous material maintained at a temperature in the range between about 200° C. and about 360° C., whereby sulfate contained therein is converted to oxides of sulfur, exhausting oxides of sulfur and other volatile constituents produced by the reaction, heating the mother liquor impregnated carbonaceous material in an atmosphere of gaseous chlorine and oxygen to a temperature in the range between about 300° C. and about 600° C. and recovering the volatilized phosphorus oxychloride.

10. A method of preparing phosphorus oxychloride which comprises reacting leached zone material with sulfuric acid, leaching the resulting slurry countercurrently with water, filtering the insoluble material from the impure acidic phosphorus-bearing solution, adding to the solution sulfates of ammonia to precipitate ammonium aluminum sulfate, adjusting the pH of the extracted solution with ammonium hydroxide to approximately 4.5, whereby solid phosphate salts of iron and aluminum are precipitated separating the solid phosphate salts from solution, digesting the solid salts with approximately 32 pounds of 96% sulfuric acid per pound of solids, heating the solution to approximately 182° C. for about 2 hours whereby iron and aluminum are precipitated as the sulfate salts, cooling the solution to approximately 75° C., filtering the salts from the concentrated acid solution, spraying the mother liquor upon a bed of bagasse maintained at a temperature of approximately 300° C. in proportions of about 3.7 pounds of liquor per 10 pounds of bagasse, whereby sulfate contained therein is converted to oxides of sulfur, exhausting and recovering the oxides of sulfur, heating the impregnated bagasse in an atmosphere of gaseous chlorine and oxygen at a temperature of approximately 550° C. and recovering the phosphorus oxychloride by condensation from the volatiles withdrawn from the reaction zone.

References Cited in the file of this patent

UNITED STATES PATENTS

| | | |
|---|---|---|
| 110,084 | Spence | Dec. 13, 1870 |
| 1,103,115 | Washburn | July 14, 1914 |
| 1,570,353 | Jacobson | Jan. 19, 1926 |
| 2,467,271 | Peer | Apr. 12, 1949 |
| 2,570,924 | Dupont | Oct. 9, 1951 |
| 2,622,965 | Tidwell | Dec. 23, 1952 |
| 2,712,494 | Dupont | July 5, 1955 |